March 25, 1930.  F. SCHAEFER  1,751,661

ATTACHMENT OF BRAKE LEVERS TO CONNECTING RODS

Filed July 14, 1925

WITNESSES
A B Wallace

INVENTOR
Frederic Schaefer
by Winter, Brown & Critchlow,
his attorneys.

Patented Mar. 25, 1930

1,751,661

UNITED STATES PATENT OFFICE

FREDERIC SCHAEFER, OF PITTSBURGH, PENNSYLVANIA

ATTACHMENT OF BRAKE LEVERS TO CONNECTING RODS

Application filed July 14, 1925. Serial No. 43,523.

The invention relates to a brake rigging for a railway truck, and its object is to provide an improved connection for a brake lever to a connecting rod to the end that these members of a brake rigging may not become disconnected by the accidental loss of a connecting pin.

Figure 1:
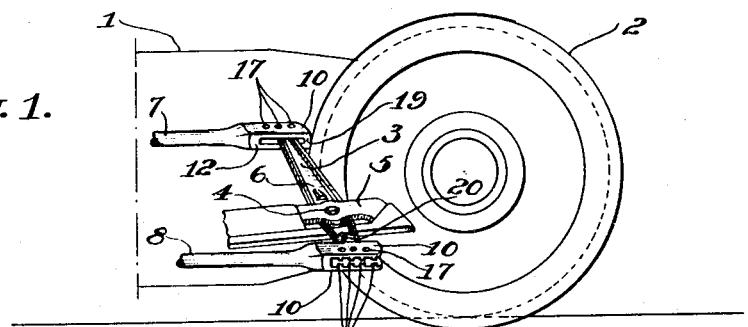
Figure 2:
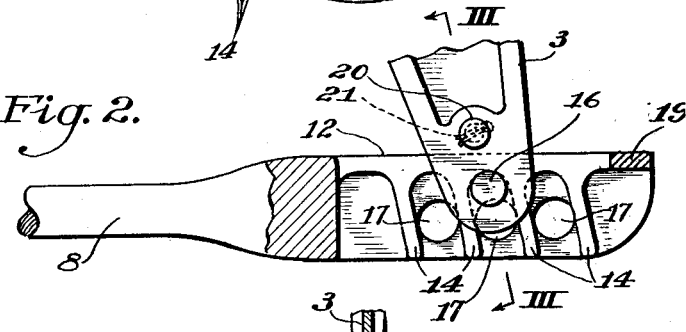
Figure 3:
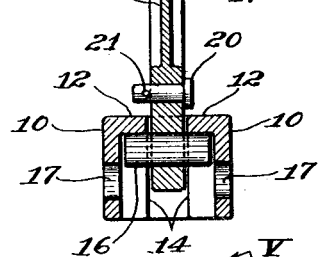

The invention is illustrated in the accompanying drawings, of which Fig. 1 is a somewhat diagrammatic side view of a railway car truck showing a brake lever with connecting rods attached to its ends; Fig. 2 an enlarged side or face view of the lower end of the brake lever of Fig. 1 attached to a connecting rod, the end of the connecting rod being illustrated in central sectional view; Fig. 3 a sectional view taken on the line III—III, Fig. 2; and Figs. 4 and 5 views corresponding with Figs. 2 and 3, respectively, showing a modification of construction.

Having reference first to Fig. 1, a railway truck comprising a frame 1 and wheels 2 is shown as having a brake lever 3 pivotally connected intermediate of its ends by a pin 4 to a slotted yoke 5 through which the brake lever extends. The brake lever may be, and preferably is, provided with a yoke-engaging projection 6 adjacent to yoke 5 to prevent the brake lever from slipping through the yoke in case pin 4 is lost or broken. This construction is fully disclosed in my copending patent application Serial No. 30,957, filed May 18, 1925, and need not be here further explained. The upper end of the brake lever is pivotally attached to a connecting rod 7 which extends to a brake cylinder, and its lower end is pivotally attached to a connecting rod 8 which is indirectly connected to a brake beam in the usual or any desired manner. It is the connections of the ends of the brake lever to rods 7 and 8 that the invention is concerned with.

Having reference to the connection of rod 8 to the lower end of brake lever 3, and referring first to the embodiment of the invention illustrated in Figs. 2 and 3, the end of rod 8 is bifurcated to form the two sides 10 with a slot between them, and in which slot the end of the brake lever is arranged. The upper edges of these sides are provided with inwardly turned flanges 12, and their inside faces with similar flanges 14 which form pockets for receiving projections 16 extending laterally from the end of the brake lever. These projections may take the form of a pin driven into a suitable opening at the end of the brake lever, and if desired, the sides 10 may be provided with openings 17 through which this pin may be driven into the brake lever opening, the openings 17 being materially below flanges 12 so that when the brake lever and connecting rod are assembled in operative position the pin cannot escape through either opening in sides 10. To strengthen the connecting rod the outer ends of its sides or bifurcations 10 are preferably connected by a transverse member 19.

In making the connection shown in Figs. 2 and 3, the end of brake lever 3 is inserted through the slot between the bifurcations 10 of rod 8, and thereafter pin 16 may be inserted through the opening in the end of the brake lever. This pin may be inserted when the end of the brake lever is below the lower edge of the connecting rod, or it may be inserted through one of the openings 17 in the connecting rod bifurcations. The brake lever is then drawn upwardly with the ends of pin 16 lying in a pocket formed by top flanges 12 and side flanges 14. As is customary in the attachment of brake levers to connecting rods, provision is made in the construction here disclosed for making the connection at variable distances from the end of the connecting rod. For this purpose the bifurcations 10 may be provided with flanges 12 and 14 forming three pockets for receiving pin 16. After the brake lever has been connected to the rod, a pin 20 may be inserted through the lever above the rod for preventing the rod from moving upwardly upon the lever and thereby possibly disengaging pin 16 from the pockets formed by the flanges on the rod bifurcations. Pin 20 may be held in place by a cotter pin 21, or in any other desired manner.

Figure 4:
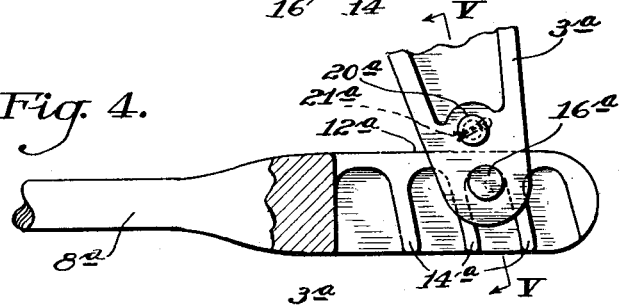
Figure 5:
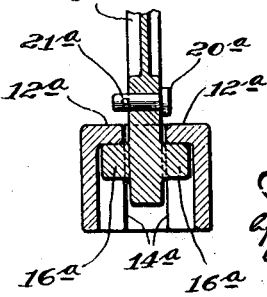

The embodiment of the invention illustrated in Figs. 4 and 5 differs from that just explained with particular reference to Figs. 2 and 3 only in that the brake lever 3ª of Figs. 4 and 5 instead of being provided at its end with a separate pin extending through an opening in the lever, is provided with lateral projections 16ª forged integrally with the brake lever. When the projections are so formed on the brake lever the outer ends of the bifurcations 10ª of the connecting rod 8ª are not connected to each other, the construction being such that the brake lever may be moved longitudinally from the end of the rod between the bifurcations with its lateral projections 16ª below the lower edge of the rod. When the projections register with the particular pocket formed by flanges 12ª and 14ª into which it is desired to enter the projections, the brake lever is moved upwardly, and thereafter a pin 20ª may be inserted through the lever above the rod.

It is to be observed of the connection provided according to this invention that the connection between a brake lever and connecting rod cannot be broken by the loss of a pin. In the form shown in Figs. 2 and 3, pin 16 cannot escape through openings 17 after the connection has been made, and in the form shown in Figs. 4 and 5 the lateral projections 16ª, which are the equivalent of the pin shown in Figs. 2 and 3, are forwarded integrally with a brake lever. As generally shown in Fig. 1, the brake lever may have the same connection with rod 7 as with rod 8.

According to the provisions of the patent statutes, I have explained the principle and operation of my invention, and have illustrated and described what I now consider to represent its best embodiment. However, I desire to have it understood that, within the scope of the appended claim, the invention may be practiced by forms of construction other than those specifically illustrated and described.

I claim:

In a brake rigging for a railway car truck, the combination of a connecting rod having a rigid end formed of two laterally-spaced vertically-disposed walls provided on their adjacent faces with inwardly turned horizontal and vertical flanges forming a plurality of separate pin-receiving pockets open at the bottom of the rod, and a brake lever having an end arranged between said walls and provided with lateral projections lying in a pair of said pockets and engaged by the flanges forming the pockets in which the projections lie, said vertically-disposed walls overhanging the ends of said projections and confining the projections between them.

In testimony whereof, I sign my name.

FREDERIC SCHAEFER.